No. 101,702.
PATENTED APR. 12, 1870.
J. BARLOW.
TRUCK FOR MOVING BUILDINGS.
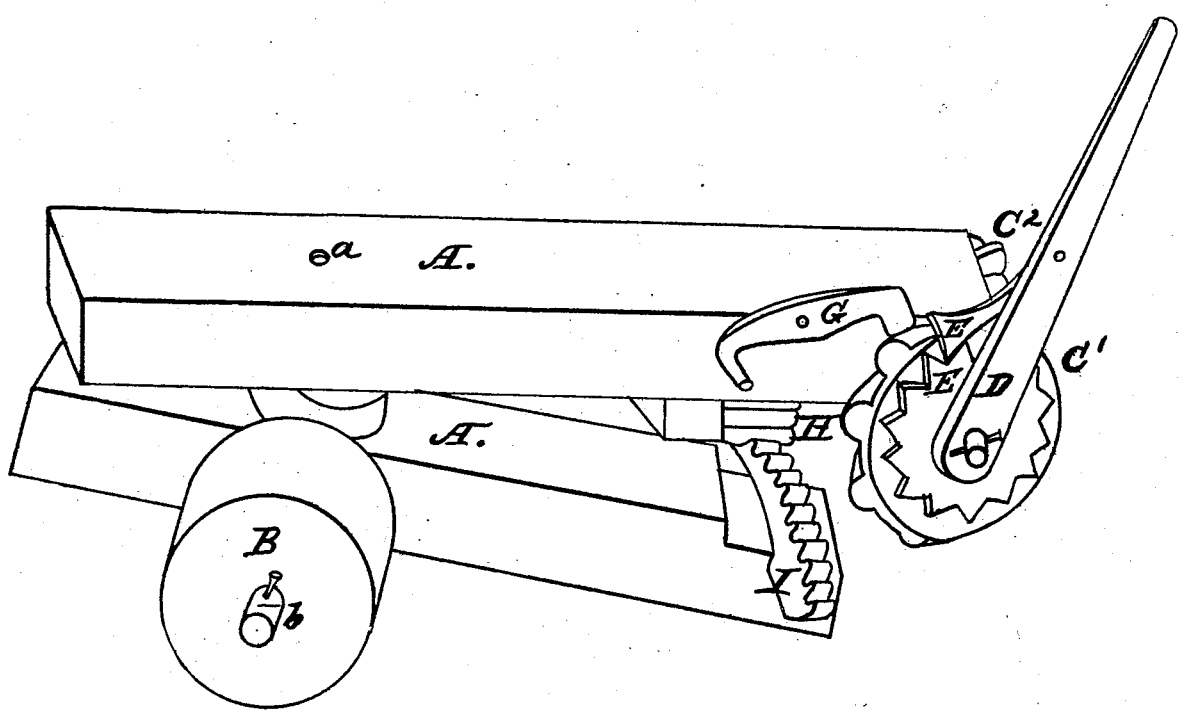
Witnesses.
Albert W. C. Weeks.
Corydon E. Fuller.
Inventor.
Jesse Barlow.

United States Patent Office.

JESSE BARLOW, OF VAN METER, IOWA.

Letters Patent No. 101,702, dated April 12, 1870.

IMPROVEMENT IN TRUCKS FOR MOVING BUILDINGS.

The Schedule referred to in these Letters Patent and making part of the same.

I, JESSE BARLOW, of Van Meter, in the county of Dallas and State of Iowa, have invented certain Improvements in Trucks for Moving Buildings and other heavy bodies, of which the following is a specification.

My invention is designed to provide a strong, durable, and simple machine for controlling the direction of a truck or trucks, when underneath a building, or any other cumbersome object that is to be moved from its position.

The drawing is a perspective side view of my truck and machinery.

A A is the frame, composed of two straight beams, which are connected by the pivot a. The material, size, form, and strength of the frame, and also the other parts of my machine, may be varied and adapted for the different uses required.

B represents one of the rollers or wheels required. They are mounted on the iron axle b, upon which the truck rests and moves.

C C is a bevel-gear.

D is a lever, pivoted on the axle of the bevel-wheel No. 1.

E is a ratchet, pivoted is the lever D.

F is a ratchet-wheel, combined with the bevel-wheel No. 1.

G is a pawl, pivoted to the frame, and designed to lock the bevel-gear, when desired.

H is a pinion or small cog-wheel, connected on the same shaft with the bevel-wheel No. 2, and is the driving-wheel, which travels on the cammed rack or track, or else moves that rack and the lower part of the truck to the right or to the left, as may be desired.

I is the rack or track, in the form of a section of a circle, and is bolted or otherwise firmly attached to the end of the lower beam A.

By placing and fastening one of my trucks under each of the four corners of a building, I can, by simply working the levers, control the direction of the rollers or wheels, and thereby guide the trucks and the building to the right or to the left, or straight forward.

The ratchet E, pivoted on the lever D, can be readily reversed from side to side, and the lever and bevel-gear thereby worked to the right or to the left, as the desired change of direction may require.

This invention may also be used for controlling and guiding the rudder of a ship, or any floating vessel.

It may also be applied to the purpose of transporting heavy artillery, and for trailing guns in position. When the truck or gun-carriage is fixed stationary, the pinion or driving-wheel H will travel on the rack I, and a gun mounted on the truck or carriage will be easily directed or trailed from right to left, and vice versa.

I am aware that there is nothing new in the mechanism of my invention, excepting in the manner of combining and applying it, in a simple way, to accomplish the purposes specified.

Claim.

I claim as my invention—

The combination of a bevel-gear, a ratchet and ratchet-wheel, a pinion, and a cammed rack, with a truck or carriage, substantially as described, for the purpose of moving buildings and other heavy objects.

JESSE BARLOW.

Witnesses:
ALBERT W. O. WEEKS,
CORYDON E. FULLER.